US 12,134,488 B2

(12) United States Patent
Sidoti et al.

(10) Patent No.: US 12,134,488 B2
(45) Date of Patent: Nov. 5, 2024

(54) UNMANNED AERIAL VEHICLE WITH COLLISION TOLERANT PROPULSION AND CONTROLLER

(71) Applicant: FLYABILITY SA, Lausanne (CH)

(72) Inventors: Antonino Sidoti, Lausanne (CH); Mathieu Valceschini, Pully (CH); Alexandre Pabouctsidis, Lausanne (CH); Ludovic Daler, Chardonne (CH); Adrien Briod, Lausanne (CH)

(73) Assignee: FLYABILITY SA, Lausanne (CH)

( * ) Notice: Subject to any disclaimer, the term of this patent is extended or adjusted under 35 U.S.C. 154(b) by 508 days.

(21) Appl. No.: 17/432,882

(22) PCT Filed: Feb. 19, 2020

(86) PCT No.: PCT/EP2020/054399
§ 371 (c)(1),
(2) Date: Aug. 20, 2021

(87) PCT Pub. No.: WO2020/169686
PCT Pub. Date: Aug. 27, 2020

(65) Prior Publication Data
US 2022/0097865 A1    Mar. 31, 2022

(30) Foreign Application Priority Data
Feb. 20, 2019   (EP) ..................................... 19158413

(51) Int. Cl.
*B64U 30/299*       (2023.01)
*A63H 27/00*        (2006.01)
(Continued)

(52) U.S. Cl.
CPC ........... *B64U 30/299* (2023.01); *A63H 27/12* (2013.01); *B64U 10/14* (2023.01); *B64U 30/20* (2023.01);
(Continued)

(58) Field of Classification Search
CPC .......... B64C 1/08; B64C 1/062; B64C 27/006; B64U 10/14; B64U 30/24; B64U 30/299
See application file for complete search history.

(56) References Cited

U.S. PATENT DOCUMENTS 9,650,135 B2    5/2017  Keennon et al.
9,828,095 B1 *  11/2017 Wilcox ................ G05D 1/0808
(Continued)

FOREIGN PATENT DOCUMENTS

CN       104176247 A     12/2014
CN       104755373 A      7/2015
(Continued)

OTHER PUBLICATIONS

European Patent Office/ISA, International Search Report and Written Opinion for PCT Application No. PCT/ EP2020/054399, mail date May 20, 2020.
(Continued)

*Primary Examiner* — Joshua J Michener
*Assistant Examiner* — Arfan Y. Sinaki
(74) *Attorney, Agent, or Firm* — SoCal IP Law Group LLP; Angelo Gaz

(57) ABSTRACT

Vertical take off and landing unmanned aerial vehicle (UAV) comprising a multi-propeller propulsion system ("the system"), an outer protective cage surrounding the system, an autonomous power source, a sensing system, and a control system. The sensing system has an orientation sensor and a displacement sensor. The system has at least two propellers spaced apart in a non-coaxial manner. The control system controls the flight or hovering of the UAV. The control system reverses thrust on at least one propeller distal from a point of contact with an obstacle while controlling a motor of a proximal propeller from the contact point to generate lift, the thrust of the distal and proximal propellers being
(Continued)

controlled to exert lift on the UAV to counteract gravitational force thereon and apply a moment of rotation about the point of contact to stabilize the position of the UAV or to counteract torque resulting from inertia.

17 Claims, 13 Drawing Sheets

(51) Int. Cl.
    *B64U 10/14*     (2023.01)
    *B64U 30/20*     (2023.01)
    *B64U 30/24*     (2023.01)
    *B64U 50/19*     (2023.01)

(52) U.S. Cl.
    CPC .............. *B64U 30/24* (2023.01); *B64U 50/19* (2023.01); *B64U 2201/10* (2023.01)

(56) References Cited

U.S. PATENT DOCUMENTS

| | | | | |
|---|---|---|---|---|
| 10,988,241 | B2* | 4/2021 | Santangelo | B64C 39/024 |
| 2014/0131507 | A1* | 5/2014 | Kalantari | B64C 25/36 |
| | | | | 244/2 |
| 2014/0138477 | A1 | 5/2014 | Keennon et al. | |
| 2015/0286216 | A1 | 10/2015 | Miwa | |
| 2017/0043694 | A1 | 2/2017 | Tanaka et al. | |
| 2017/0050726 | A1* | 2/2017 | Yamada | B64C 27/20 |
| 2017/0233072 | A1* | 8/2017 | Chang | B64C 39/024 |
| | | | | 244/2 |
| 2017/0291697 | A1* | 10/2017 | Kornatowski | B64C 27/20 |
| 2018/0170533 | A1* | 6/2018 | Lee | B64D 47/08 |
| 2019/0004541 | A1 | 1/2019 | Tian et al. | |
| 2019/0009893 | A1 | 1/2019 | Toyama et al. | |
| 2019/0073912 | A1* | 3/2019 | Mellinger, III | G06V 20/17 |

FOREIGN PATENT DOCUMENTS

| | | | | | |
|---|---|---|---|---|---|
| CN | 107310720 | A | * | 11/2017 | B64C 1/08 |
| CN | 108082506 | A | * | 5/2018 | B64C 1/08 |
| CN | 110203386 | A | * | 9/2019 | B64C 1/08 |
| EP | 2813428 | A1 | | 12/2014 | |
| WO | 2015105554 | A1 | | 7/2015 | |
| WO | 2018010097 | A1 | | 1/2018 | |

OTHER PUBLICATIONS

CNPA, Notice on the First Office Action for Chinese Application No. 2020800154003, mail date Nov. 20, 2023.

* cited by examiner

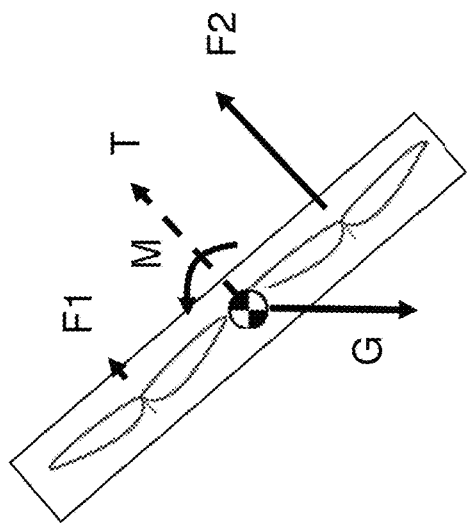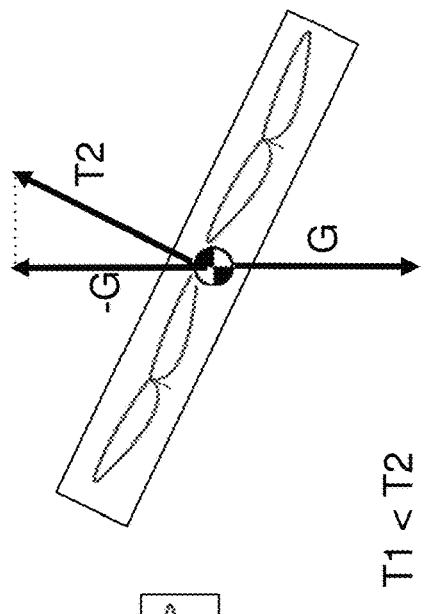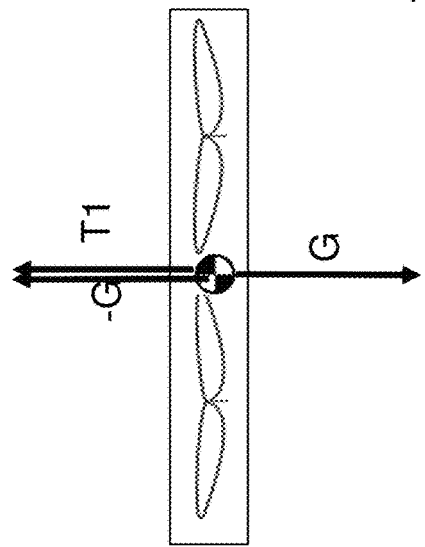

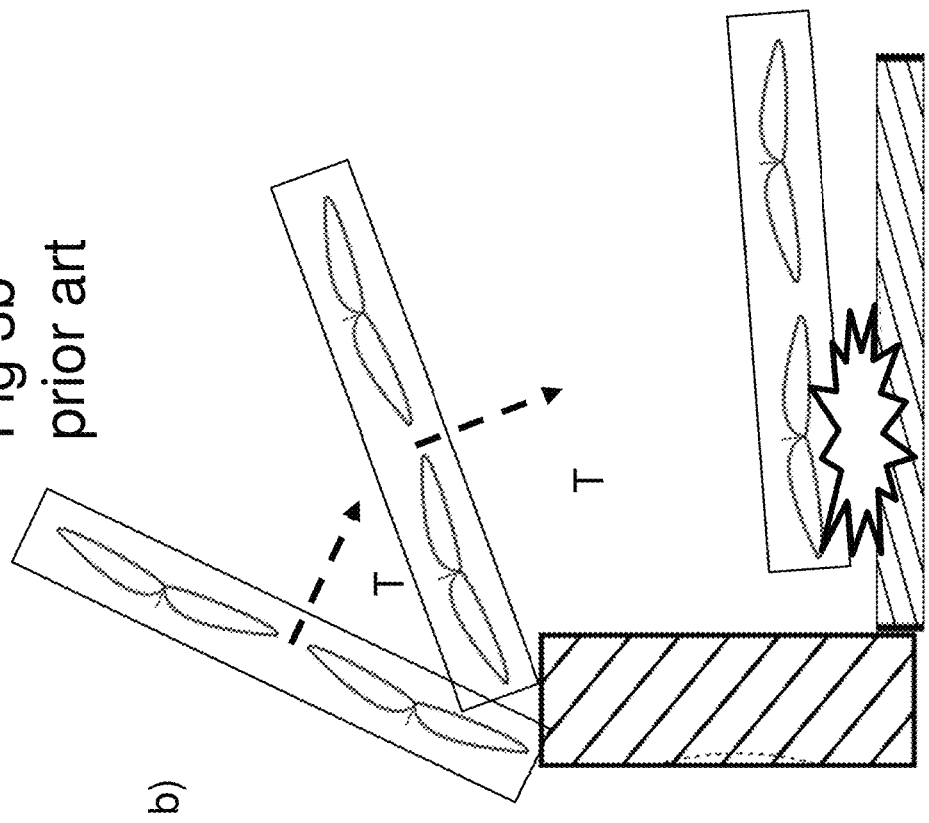
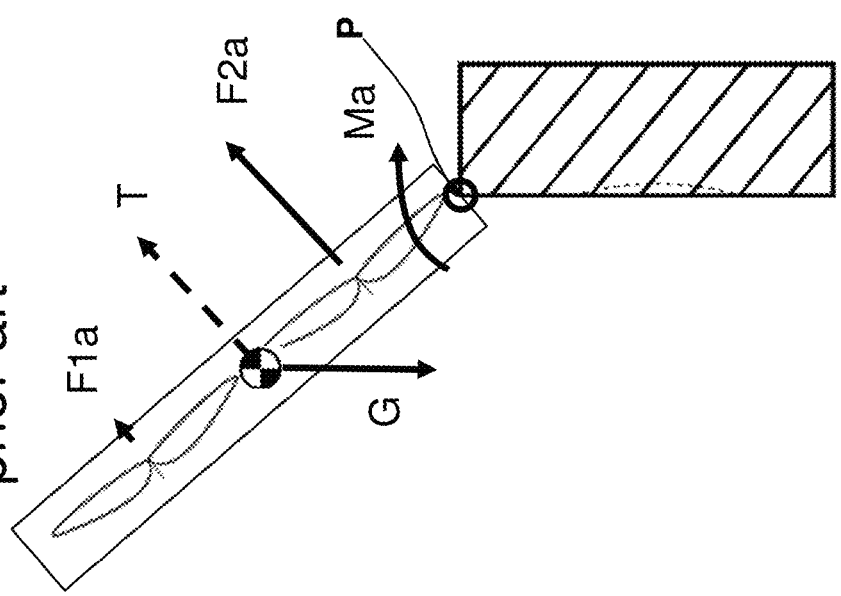

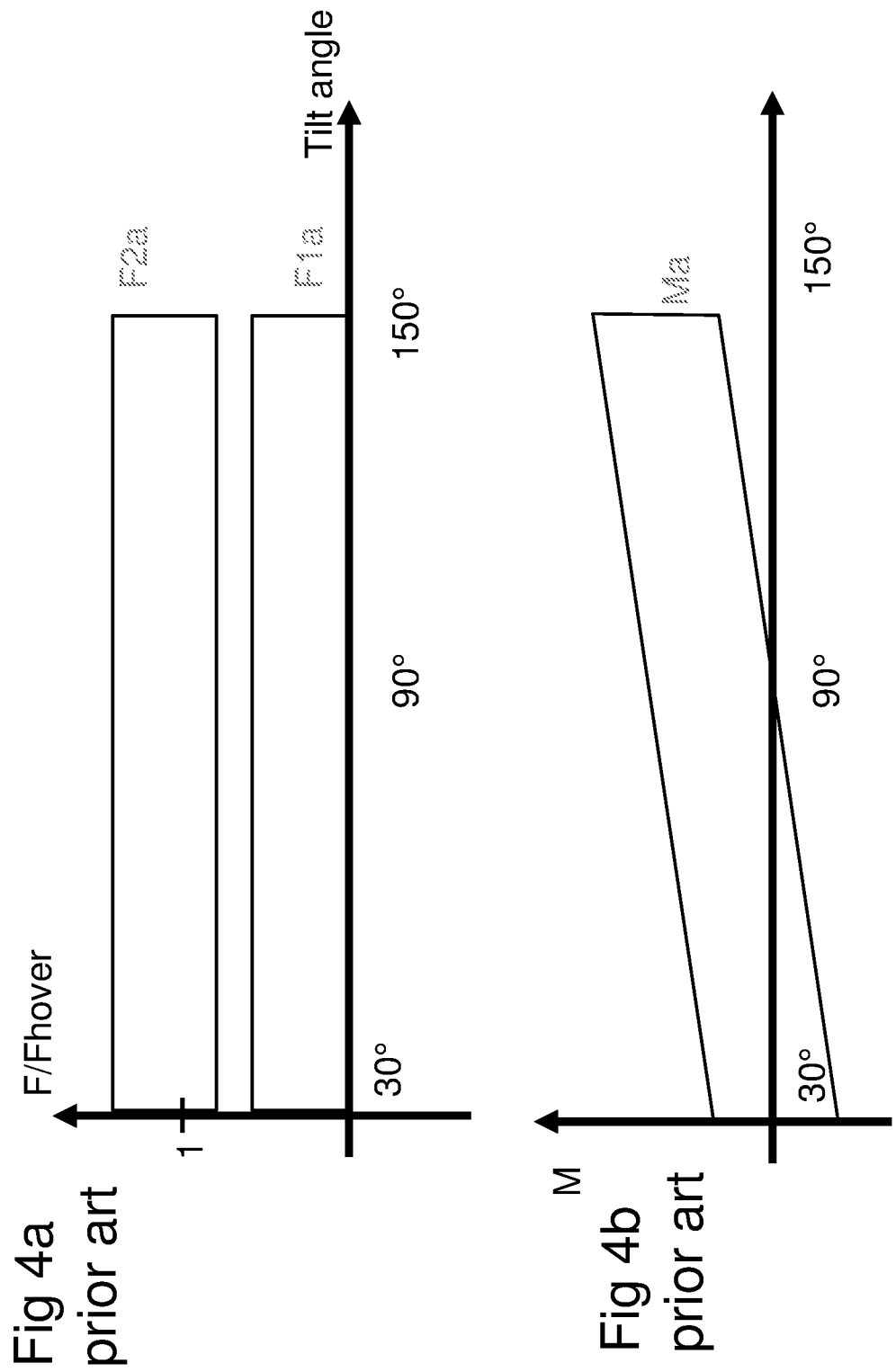

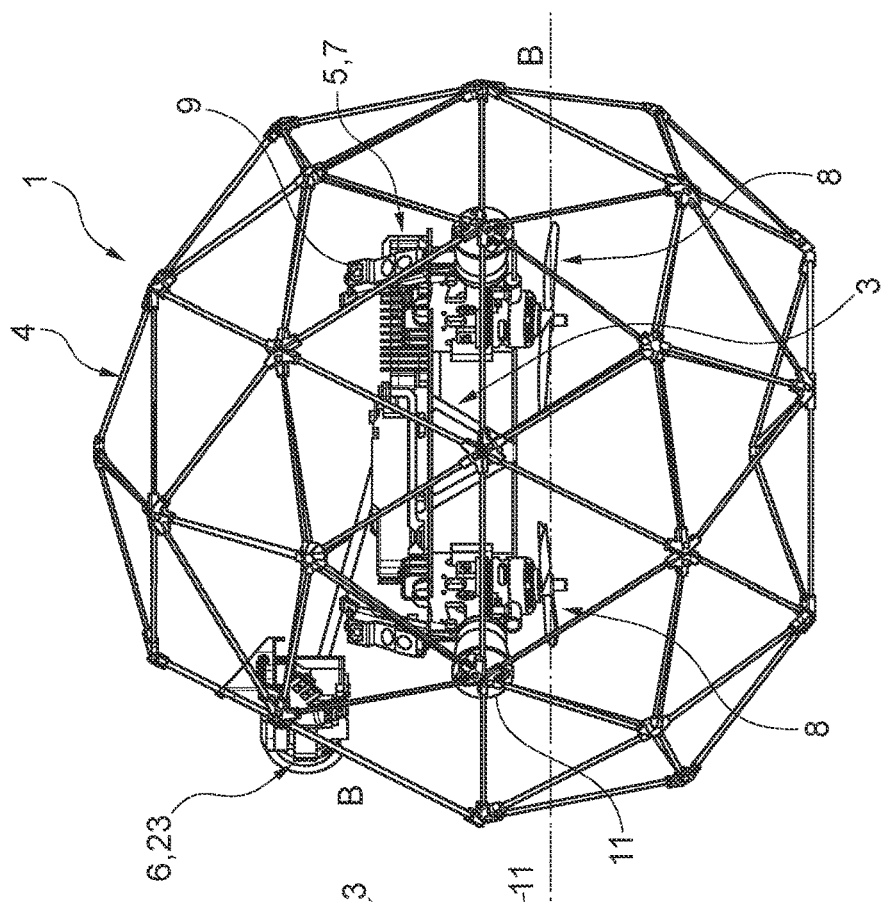
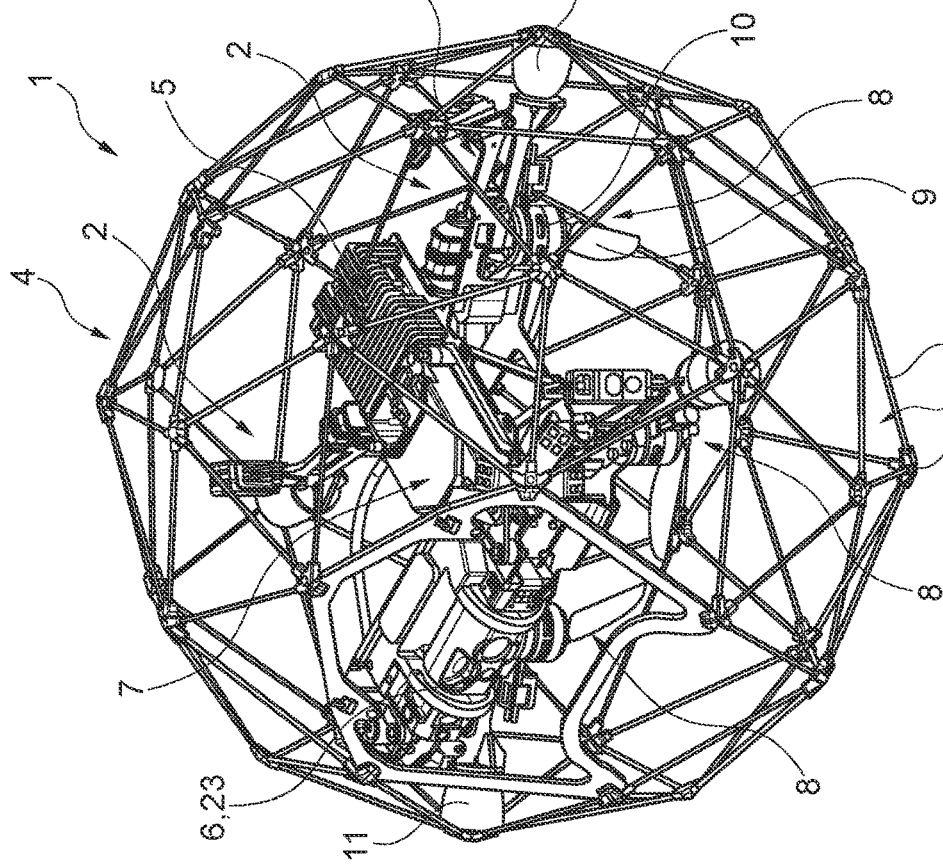

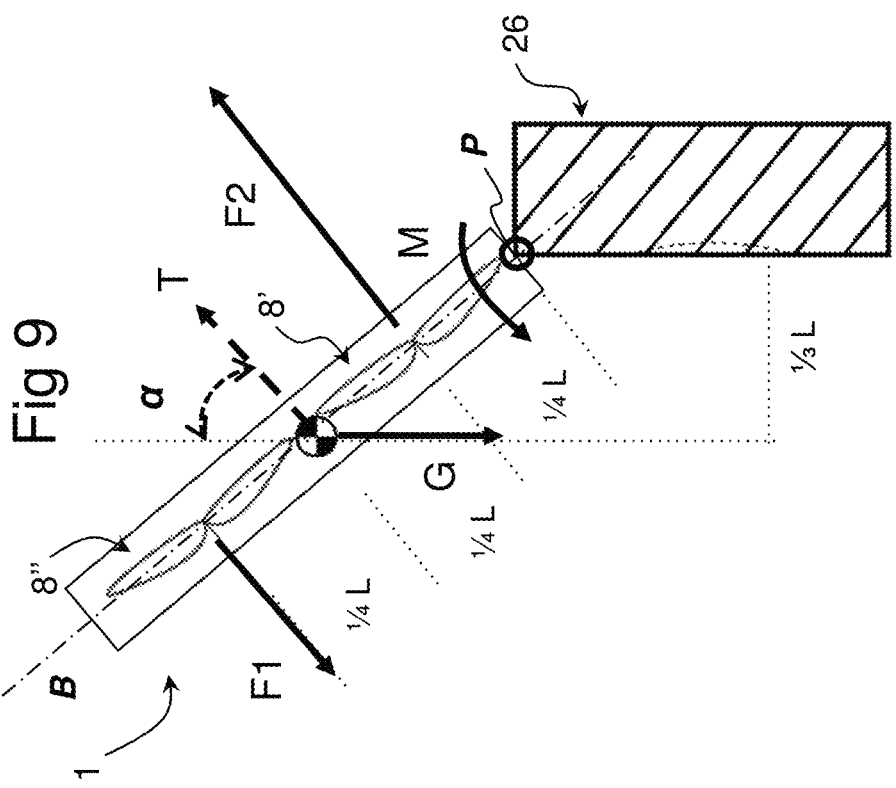

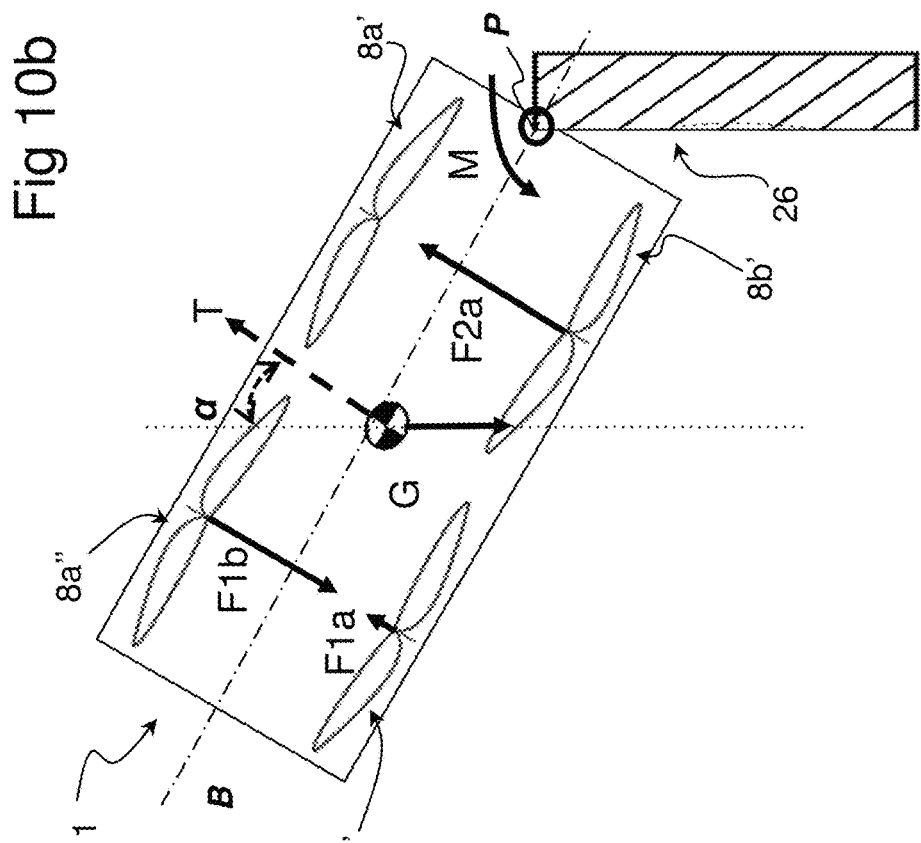
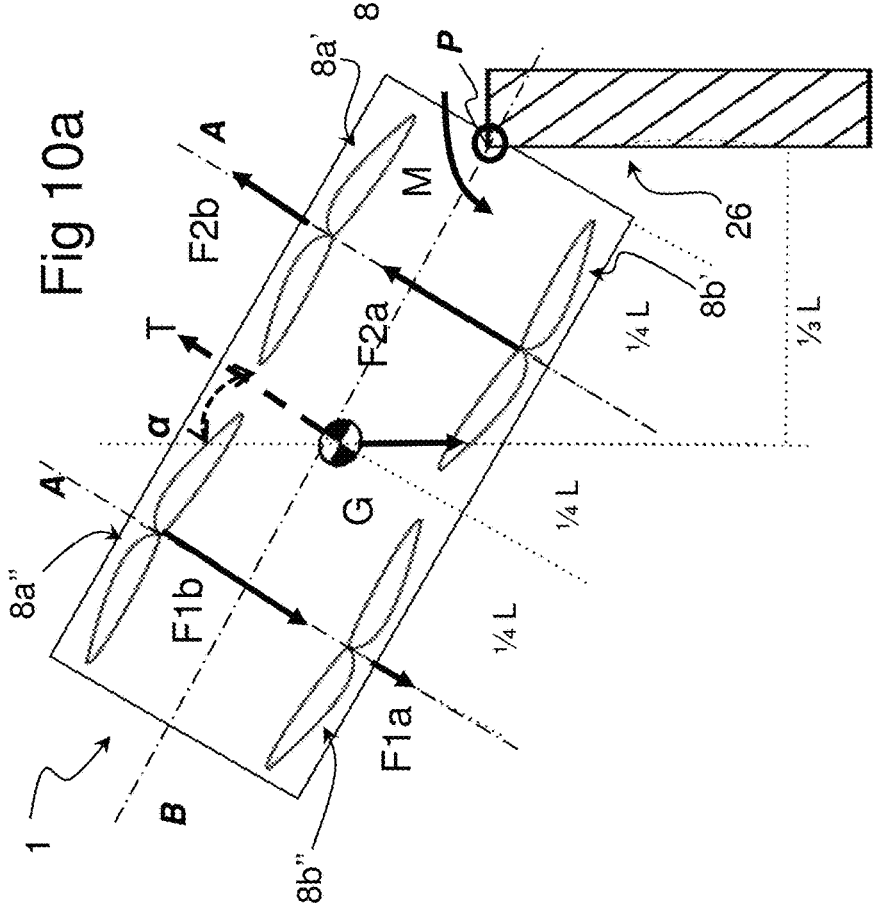

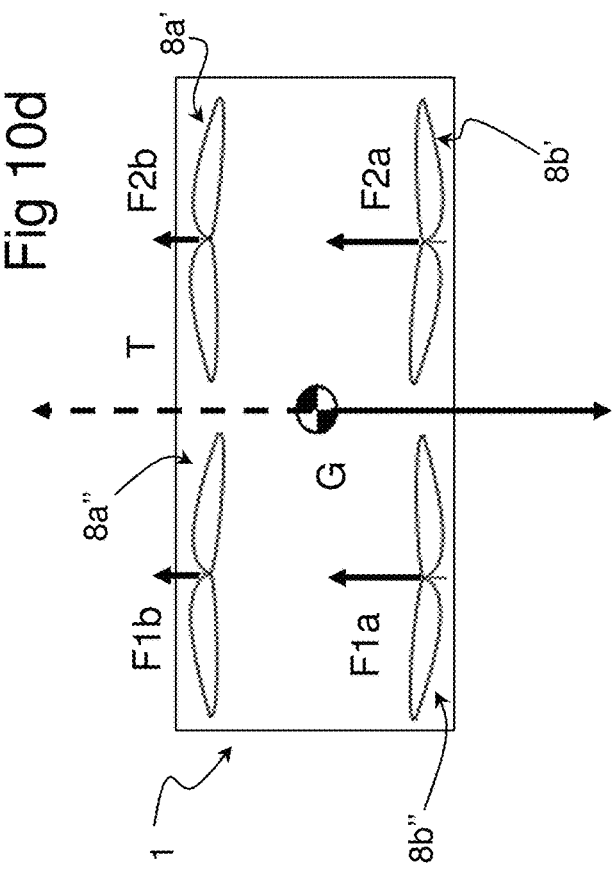
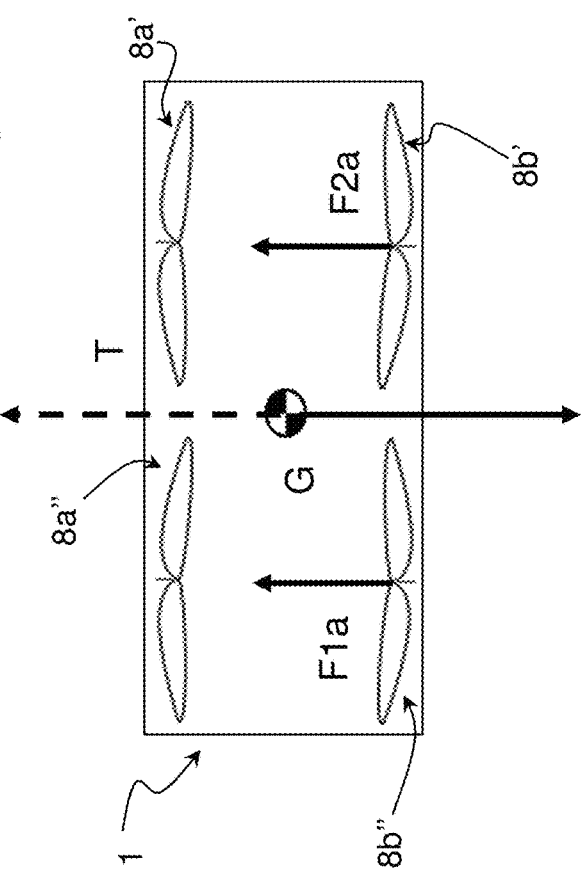

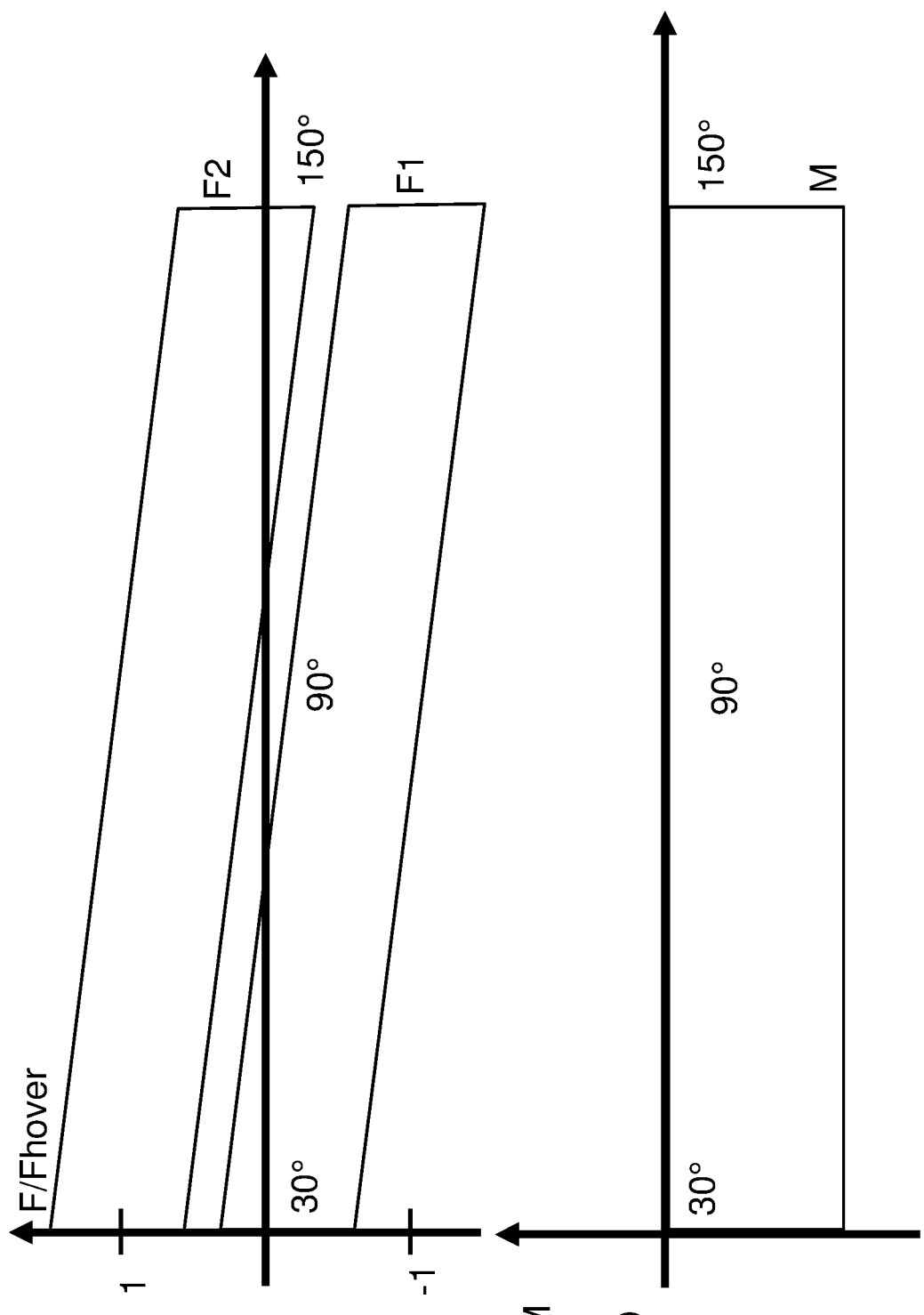

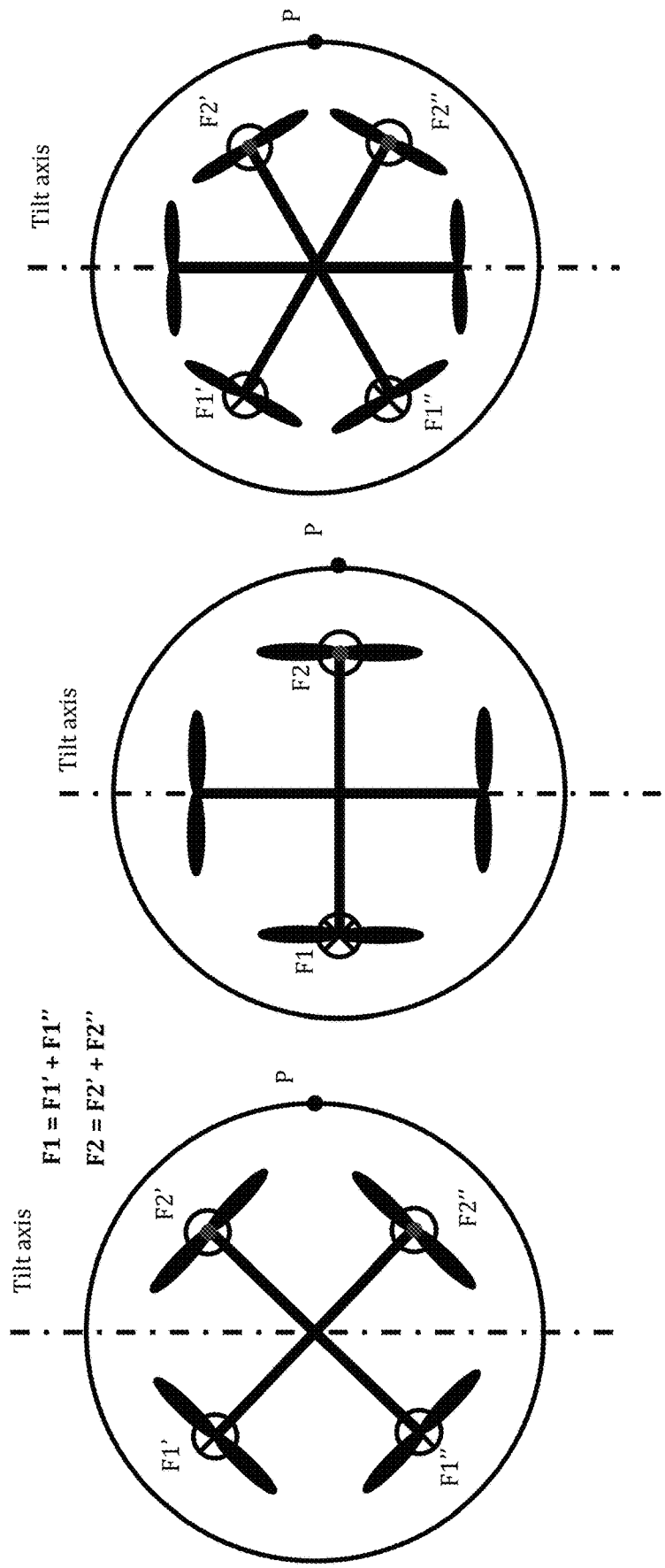

UNMANNED AERIAL VEHICLE WITH COLLISION TOLERANT PROPULSION AND CONTROLLER

RELATED APPLICATION INFORMATION

This patent claims priority from International PCT Patent Application No. PCT/EP2020/054399, filed Feb. 19, 2020 entitled, "UNMANNED AERIAL VEHICLE WITH COLLISION TOLERANT PROPULSION AND CONTROLLER", which claims priority to European Patent Application No. EP19158413.5, filed Feb. 20, 2019 all of which are incorporated herein by reference in their entirety.

The present invention relates to a VTOL (vertical take-off and landing) unmanned aerial vehicle (hereinafter also referred to as "UAV") with a protective outer cage, and a propulsion system and controller which reduce the disturbances provoked by a contact with an external object, allowing to prevent the UAV from colliding at significant speed into other obstacles.

Technical advantages of certain embodiments of the present invention may allow to increase the robustness or enable new uses of UAVs in various applications involving flight close to obstacles, structures, objects, people, etc. Such applications are for example inspection or monitoring of infrastructure outdoors or indoors, surveillance of assets, etc.

VTOL aerial vehicles generally fly thanks to a propulsion system (e.g. one or more propellers) that generates an upward force (lift) to counter gravity. Such vehicles are capable of slow flight (hovering flight), vertical take-off or vertical landing, and have generally a control system to control their orientation or direction in order to stay in a stable orientation or to move sideways. When the aerial vehicle is not in a stable orientation, e.g. its propulsion system creates a force that is not pointing mostly upwards, the aerial vehicle can quickly lose lift, or gain speed towards the direction in which the propulsion system creates a force.

UAVs are generally controlled so that they remain in a stable orientation in hovering flight, or slightly tilted in order to move sideways. In hovering flight, the controller generally applies a hovering thrust that compensates the gravity force applied on the drone in order to maintain a constant altitude. The thrust is the resulting force obtained by adding up each force vector generated by each propeller. In general, the controller applies more thrust than the hovering thrust while tilted, in order to still compensate for gravity despite the thrust force being tilted, so as to maintain the same altitude while moving sideways (see FIG. 1).

In order to control the orientation of the drone, for example to bring it back to a stable orientation, the control system is generally applying a torque that affects the angular speed and orientation of the drone, by varying the relative force generated by each propeller, typically by generating more force (F2) with the propeller(s) on the side that is tilted down (FIG. 2).

Aerial vehicles designed to fly close to obstacles are often equipped with protective outer cages typically surrounding the propulsion system and control system. These protective cages prevent external objects to damage sensitive parts such as rotating propellers or control surfaces, or to absorb collision energy when the aerial vehicle collides into obstacles or falls to the ground. They are generally built so that openings allow the airflow to go through the structure without affecting too much the lift force generated by the propulsion system.

When an aerial vehicle enters in contact with an obstacle, a protective outer cage may prevent any damage to the UAV. However, a contact with an obstacle can provoke relatively large external torques and forces that can disturb the orientation of the aerial vehicle, which can provoke the UAV to lose altitude (due to the pull of gravity) or gain significant speed towards the direction where the propulsion system is pointing, which puts the UAV at risk to crash at a high speed into further obstacles.

In an attempt to reduce the risk of a catastrophic crash to happen when the orientation of the UAV is disturbed, standard controllers generate a torque in order to bring back the UAV to a stable orientation as quickly as possible, before the UAV gains significant speed, although it's likely that such a recovery will be impossible in cluttered spaces where a second collision with another obstacle usually occurs and generates a catastrophic crash.

In some situations, when an aerial vehicle enters in contact with an obstacle, the aerial vehicle can remain in contact with the obstacle, for example because of contact forces, friction, stickiness or shape of the obstacle, hooks in the environment, etc. In this situation, the UAV is hinged on the obstacle and rotates around the contact point with the obstacle. Standard controllers are designed to generate a torque that brings the drone back to a stable orientation in free space, but they can't handle this situation in many cases. When the UAV is hinged on an obstacle, standard controllers usually generate an undesired torque in the opposite direction because of the hinge (FIG. 3a), which can disturb the orientation of the aerial vehicle even further, and eventually lead to a crash (FIG. 3b).

In view of the foregoing, an object of the invention is to provide a VTOL UAV that overcomes the aforementioned drawbacks and enables both stable flight and rapid corrective action under situations of collision with an obstacle, reducing the risk of a crash.

It is advantageous to provide a VTOL UAV that is versatile and agile.

It is advantageous to provide a VTOL UAV that can fly in confined spaces and among obstacles in a safe and easy to control manner.

Objects of the invention have been achieved by providing a VTOL UAV according to disclosures herein.

Disclosed herein is a vertical take off and landing (VTOL) unmanned aerial vehicle (UAV) comprising a multi-propeller propulsion system, an outer protective cage surrounding the multi-propeller propulsion system, an autonomous power source, a sensing system, and a control system connected to the sensing system to receive measurement signals from the sensing system. The control system is electrically connected to the multi-propeller propulsion system to control motors of the propulsion system. The sensing system comprises at least an orientation sensor and a displacement sensor configured to measure the orientation and displacement of the multi-propeller propulsion system. The multi-propeller propulsion system comprises at least two propellers arranged spaced apart in a non-coaxial manner, each propeller comprising a motor having a stator and a rotor coupled to propeller blades. The control system comprises at least one microprocessor and at least one non-volatile memory in which at least one control program is executable by the microprocessor to control the multi-propeller propulsion system for flight or hovering of the VTOL UAV.

The control system comprises a program for stabilizing orientation configured to reverse thrust on at least one propeller distal from a point of contact (P) with an obstacle while controlling a motor of a proximal propeller from the contact point (P) to generate lift, the thrust of the distal and proximal propellers being controlled to exert lift on the UAV to counteract gravitational force (G) thereon and apply a moment of rotation (M) about said point of contact (P) to stabilize the position of the UAV or to counteract torque resulting from inertia.

The reversal of thrust may be obtained either by a change in direction of rotation of a propeller, or a change in pitch of variable pitch propeller blades. In yet another embodiment, thrust may be reversed by switching on a second propeller of a pair of propellers and switching off a first propeller of the pair of propellers or reducing thrust on the first propeller, the first and second propellers configured to generate thrust in opposite directions. During normal flight, the second propeller may be stationary, while the first propeller produces the lift thrust for flight. In the latter embodiment, the propellers do not necessarily need to be reversible and may each be configured for rotation in a single direction.

In an advantageous embodiment, the multi-propeller propulsion system comprises propellers arranged in a rectangular configuration.

In an advantageous embodiment, the multi-propeller propulsion system comprises a plurality of pairs of propellers arranged spaced apart in a non-coaxial manner.

In an advantageous embodiment, the propellers of a pair are arranged in mirror image symmetry.

In an advantageous embodiment, the propeller blades are symmetrical such that they have the same aerodynamical properties in both clockwise and anti-clockwise directions of rotation.

In an advantageous embodiment, the propellers of a pair of coaxial propellers are connected to the control system in a manner configured to be independently controlled.

In an advantageous embodiment, at least some of said propellers are reversible and may be controlled by the control system to rotate in the clockwise direction or in the anti-clockwise direction, depending on the amount of thrust and the direction of thrust to be generated by the propeller. In an alternative variant, at least some of said propellers have variable pitch blades and are reversible by varying the pitch of their blades while still rotating in the same direction.

In a variant, at least some of said propellers are enclosed in a duct, providing advantageous lift and aerodynamics properties.

In an advantageous embodiment, the multi-propeller propulsion system, power source, and control system are mounted on an inner support structure coupled to the outer protective cage via suspension elements.

In an advantageous embodiment, the outer protective cage comprises a plurality of beams connected together by connectors forming a cage surrounding the multi-propeller propulsion system.

In an advantageous embodiment, the outer protective cage forms a generally spherical, square, ovoid, disc shaped or various other shape around the multi-propeller propulsion system (depending on the intended applications and purpose of the UAV).

In an advantageous embodiment, the sensing system comprises at least one gyroscope and at least one accelerometer to measure orientation and a change in velocity of the VTOL UAV.

In an advantageous embodiment, sensing system comprises an obstacle sensing system comprising at least one distance sensor which may include an optical sensor, an ultrasound sensor, or a microwave sensor configured to detect a distance of the VTOL UAV from an external object and optionally to calculate a velocity of the UAV relative to the external object.

In an advantageous embodiment, the sensing system comprises at least one proximity sensor configured to detect a contact of the outer protective cage with an external object.

In an advantageous embodiment, multi-propeller propulsion system comprises four propellers or four pairs of propellers arranged spaced apart in a square or rectangular configuration (Re).

In an advantageous embodiment, a plurality of propellers arranged spaced apart in a non-coaxial manner rotate essentially in a same plane.

In an advantageous embodiment, a plurality of propellers arranged spaced apart in a non-coaxial manner rotate in more than one plane, such that some propellers can overlap with each other.

The present invention proposes to use a propulsion system that relies on some propellers and motor controllers that can reverse the thrust direction generated by one or more propeller quickly, and a method that allows a controller to generate a torque that brings the VTOL UAV back to a stable orientation, even when hinged on an obstacle.

It is known to reverse the thrust direction generated by propellers in a UAV, whereby in WO2015105554, the thrust of a pair of propellers is reversed to enable a rolling mode on the ground, and in U.S. Pat. No. 9,650,135 the thrust of the propellers may be reversed to fly the UAV in an upside-down orientation. The present invention however provides new control schemes to handle in-flight collision with obstacles, which have not been proposed before.

The controller may use orientation, angular rates, manual pilot inputs, acceleration or other measurements or state estimations to apply commands to the motor controllers and the propellers that generate forces that stabilize the drone. The VTOL UAV being a dynamic system, a controller may apply static commands that depend on a tilt angle (relative to the plane of the propeller blades, orthogonal to the axis of rotation), and that depend on the UAV configuration, number of propellers, and contact location relative to the propellers, and then add dynamic commands that take into account the current motion of the VTOL UAV. The effect of static commands can be observed by holding the VTOL UAV statically at various tilt angles. Any dynamic command can then be added to these commands to account for the motion of the VTOL UAV, for example adding a derivative component, or a command proportional to the angular rate of the VTOL UAV, as commonly used in PID (proportional integral derivative) controllers.

Identifying the orientation of the UAV may be performed with an orientation sensor, such as gyroscopes, accelerometers, inertial measurement units (IMU), magnetometers, distance sensors, vision, horizon detection, and the like, or a combination of sensors. A tilt axis (corresponding to the Yaw axis) going through the center of the VTOL UAV, and around which the UAV is rotated with respect to the stable orientation may be identified and the propeller or group of propellers which are distal from the tilt axis, on the side of the UAV that is tilted up, are controlled such that they generate a resulting force F1, positive when pointing along the UAV's upwards direction, and negative when pointing along the UAV's downwards direction. The propeller or group of propellers which are distal from the tilt axis, on the side of the UAV that is tilted down are controlled such that they generate a resulting force F2. Between a tilt angle of 30 and 150°, a negative force F1 may be controlled by reversing one or more directions of rotations of the propellers. FIG. 12 describes tilt axes for different contact points, and describes the group of propellers used to generate F1 and F2 for various multirotor configurations.

While standard controllers will generate positive commands for F1 and F2 (FIGS. 3a and 4a), and thus generally generate a torque Ma around the hinge point P (FIG. 4b) that provokes the UAV to move further away from its stable orientation, the UAV according to embodiments of the invention applies forces F1 and F2 (FIGS. 7 and 11a) that generate a torque M that brings the UAV back to its stable orientation (FIG. 11b).

The torque around the hinge point P is composed by different terms related to propulsion system, gravity and inertial term. Assuming a positive torque to be stabilizing, it can be seen that positive F1 and F2, typical for hover flight, will always generate negative contributions, while gravity will be stabilizing until 90 degrees tilt angle. Inertial term due to the speed before collision will always be destabilizing.

$$-(1-rt)\frac{F_2}{G} - (1+rt)\frac{F_1}{G} + \cos(\alpha) > cst$$

Without loss of generality, a sufficient condition for the system to be stable is that the torque around the hinge point is always positive (stabilizing) and higher than a constant related to initial speed and inertia of the VTOL UAV. This relationship clearly shows that it is advantageous to have F1 and/or F2 negative. It also shows that typically high thrust to weight ratio, advantageous for rapid corrective actions, would not be desirable in such condition.

The constant rt is the ratio between the distance of a propeller from the center of mass and a reference length of the protective frame. It is always positive, describing how close to the protective frame the propellers are placed.

It is advantageous to use motors and motor controllers that can react quickly to commands to change thrust amplitude, as collisions with obstacles often generate dynamic situations.

It is advantageous to use motors and motor controllers that can change quickly the direction of rotation, as delays when changing direction of rotation can cause unstable behaviors in dynamic situations.

It is advantageous to use motors and propellers which can change the thrust they generate at a rate of k=8 to 50 times their nominal hovering thrust (force) per second. For example, if the nominal thrust per propeller is 4N, the propulsion system should be able to change its thrust at a rate of between 4*8=32N per second and 4*50=200N per second.

It is advantageous to use propellers that can generate a force in both directions, when rotating either clockwise either counter-clockwise. It is advantageous to use propellers whose blade are symmetric around the plane B orthogonal to their rotation axis in a way that the propellers generate the same force when rotating in either direction.

It is advantageous to use propellers with variable pitch angles which can apply a thrust in both directions while rotating in only one direction.

It is advantageous to use some propellers optimized to generate a downwards force, while other propellers are optimized to generate an upwards force, which allows to increase the reactivity with which forces can be applied in the desired direction. Instead of waiting for a propeller to change direction before generating a force in an opposite direction, this embodiment allows the propeller to start accelerating from a rotation speed closer to the commanded set point. This embodiment also allows to use propellers optimized for upwards lift, which can improve power efficiency. It can still be advantageous for this embodiment to be comprised of some propellers whose blades are symmetric around the plane B orthogonal to their rotation axis in a way that the propellers generate the same force when rotating in either direction.

It is advantageous to use the UAV according to embodiments of the invention in situations where the UAV isn't in contact with an obstacle, as it allows for a fast stabilization of the UAV while reducing the loss in altitude and the accelerations in undesired directions.

Further objects and advantageous features of the invention will be apparent from the detailed description, and annexed drawings, in which:

FIGS. 1a to 1b and 2 are schematic simplified representations of a conventional vertical take off and landing (VTOL) unmanned aerial vehicle (UAV) illustrating the forces of propulsion and gravity acting upon the UAV;

FIG. 2 is a view similar to FIGS. 1a and 1b illustrating propulsion forces applying torque to the UAV to correct its orientation;

FIGS. 3a and 3b are schematic simplified illustrations of a conventional VTOL UAV as illustrated in FIGS. 1a to 2 entering into a collision with an obstacle;

FIG. 4a is a graphical illustration of the propulsion forces applied by the propellers of the UAV of FIG. 3a trying to correct the orientation of the UAV;

FIG. 4b is a graphical illustration of the moment applied on UAV about the contact point with the obstacle dependent on the angle of inclination of the UAV about the contact point, when applying the forces represented in FIG. 4a on the propellers;

FIGS. 5e to 5g are perspective, side, and top views respectively of an inner propulsion system of the UAV of FIGS. 5a to 5d;

FIGS. 6a, 6b are views similar to FIGS. 5a, 5c showing another embodiment of the invention;

FIG. 9 is a view similar to FIG. 3a, but of a UAV according to an embodiment of the invention;

FIGS. 10a to 10d are views similar to FIG. 9 of another embodiment of a UAV according to the invention;

FIG. 11a is a graphical illustration of the propulsion forces applied by the propellers of the UAV according to FIG. 9 trying to correct the orientation of the UAV;

FIG. 11b is a graphical illustration of the moment applied on UAV about the contact point with the obstacle dependent on the angle of inclination of the UAV about the contact point, when applying the forces represented in FIG. 9 on the propellers;

FIG. 12 illustrates schematically tilt axes for different contact points and the group of propellers used to generate thrust F1, F2 for various multirotor configurations.

Figure 5A:
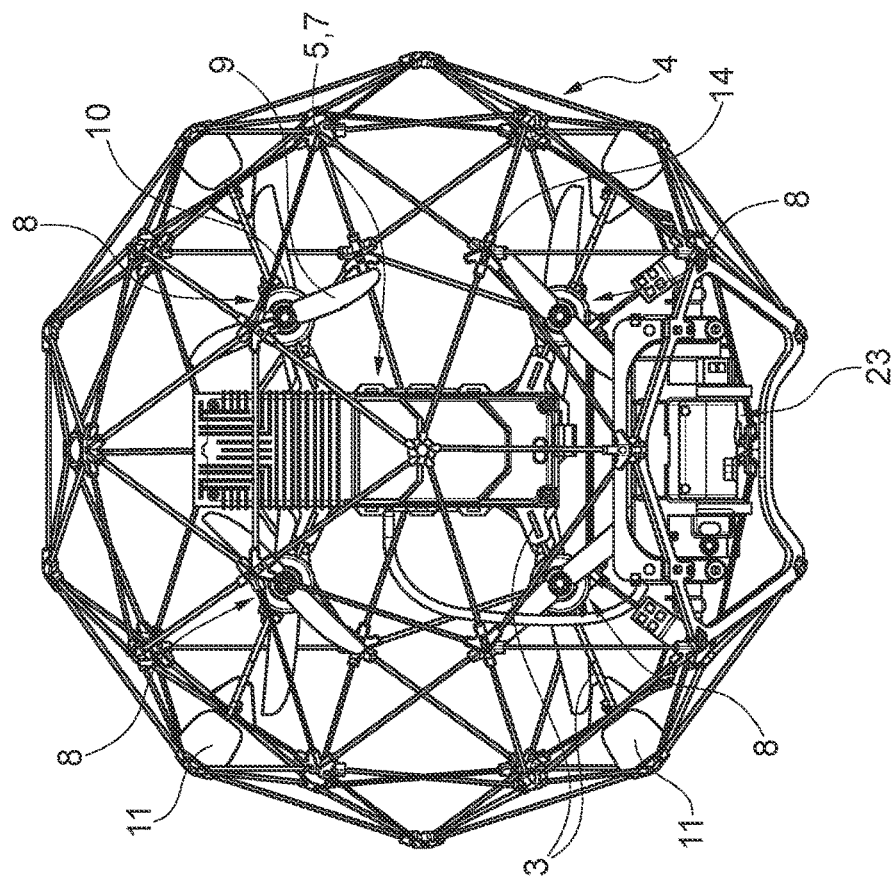
FIGS. 5a to 5d are views of a VTOL UAV according to an embodiment of the invention.
Figure 5B:
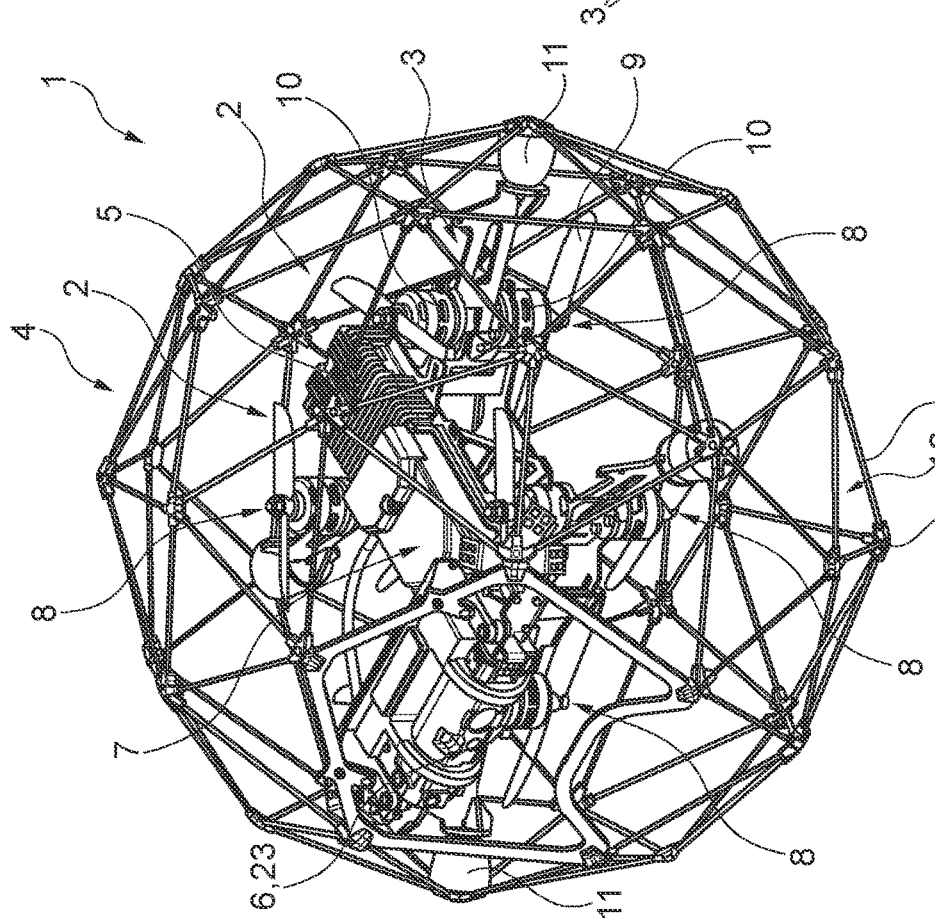
Figure 5D:
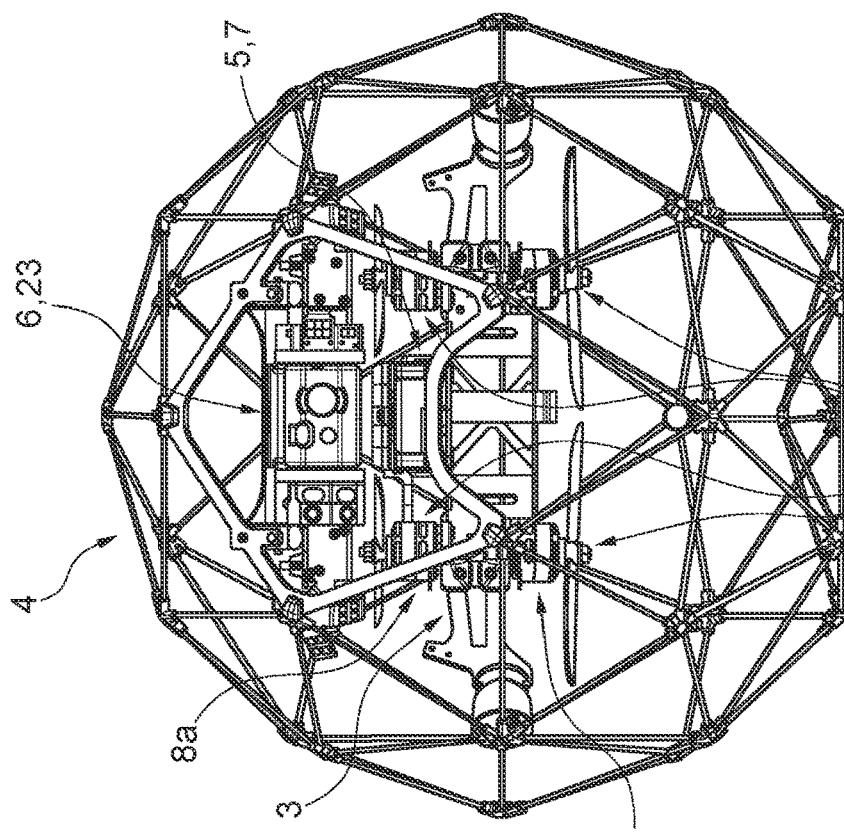
Figure 5C:
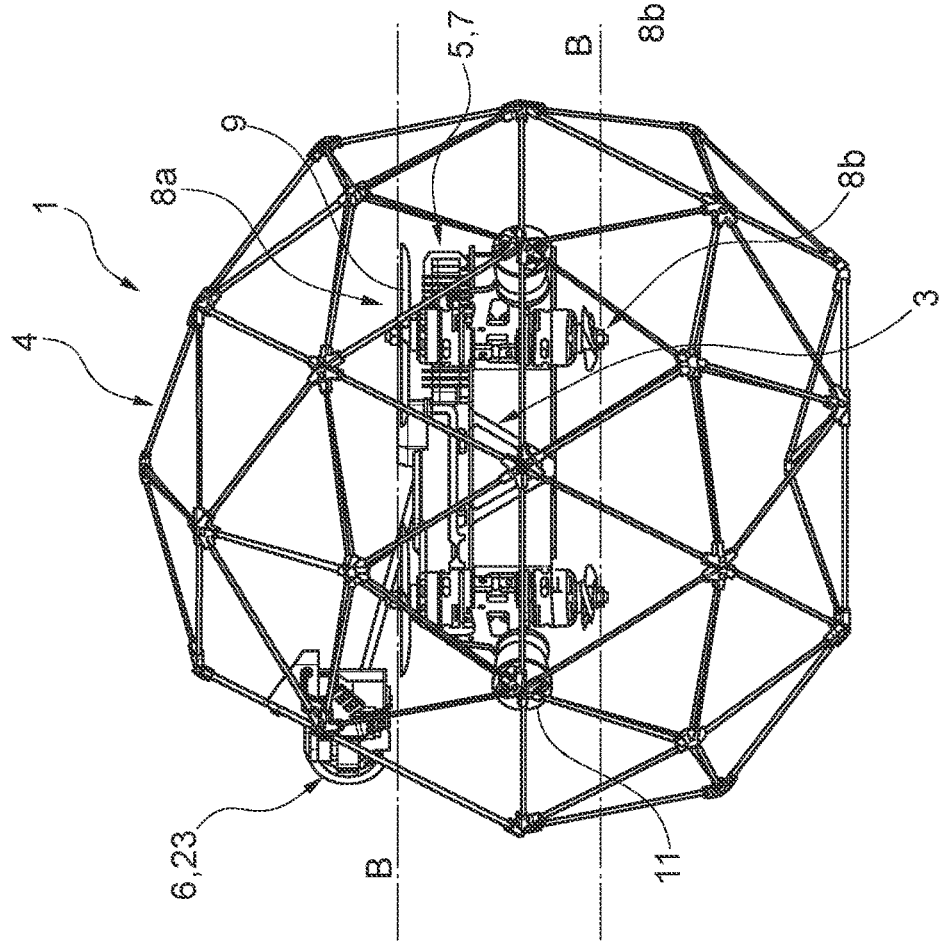

Referring to FIGS. 5a to 10d, a VTOL UAV 1 according to embodiments of the invention comprises a multi-propeller propulsion system 2 supported by an inner support structure 3 mounted inside an outer protective cage 4. The outer protective cage 4 may be formed of a plurality of beams 13 connected together by connectors 14, the beams forming for instance triangular frame modules 12 that in combination form a generally spherical outer protective cage, optionally with flattened portions or openings. Within the scope of the invention, other outer cage shapes and forms may be provided, for instance generally square, ovoid, disc shaped and various other shapes depending on the intended applications and purpose of the UAV.

The VTOL UAV 1 further comprises a power source 7, for instance in the form of a rechargeable battery, a control system 5 and a sensing system 6 that may be supported by the inner support structure 3 in conjunction with the multi-propeller propulsion system 2. Elements of the sensing system may however also be mounted in part on the outer protective cage 4, for instance position sensors or cameras 23. The VTOL UAV 1a according to embodiments of the invention may comprise further components, in particular image capture and lighting systems 23 mounted on the inner support structure 3 or and or on the outer protective cage 4.

The sensing system 96 may in particular comprise a position, orientation and displacement sensing system 19 and an obstacle sensing system 20. The position, orientation and displacement sensing system 19 may in particular comprise one or more gyroscopes and one or more accelerometers able to measure the orientation and the acceleration and direction of acceleration of the UAV 1. The accelerometers may also detect collision of the UAV with an obstacle.

Furthermore, the gyroscopes and/or accelerometers and motor feedback or motor commands can be used to estimate torques or forces applied to the drone, which can detect contact between the outer protective cage 4 of the UAV and an obstacle, or indicate the point of contact (P).

The obstacle sensing system 20 may in particular comprise distance sensors, for instance optical and or ultrasound sensors that are configured to determine the distance of the UAV from an external object and optionally to determine the rate of the displacement towards said obstacle. Other distance sensors such as microwave or millimeter wave sensors may also be used.

The obstacle sensing system may also comprise magnetic proximity sensors, for instance Hall effect sensors or capacitive sensors and/or piezoelectric sensors that can detect contact between the outer protective cage 4 of the UAV and an obstacle.

The various above-mentioned sensors are per se known in the art and may be mounted on the outer protective cage 4 or the inner support structure 3 depending on the measurement to be formed.

In addition, the sensing system may comprise a navigation sensing system including a global positioning system (GPS) and local positioning system based on optical sensors, distance sensors, WiFi or radio waves, such global and local navigation systems being also per se well known.

The control system 5 and the power source 7 are preferably mounted directly on the inner support structure 3. The inner support structure 3 may advantageously be coupled to the outer protective cage 4 via suspension elements 11 that may for instance comprise elastic pods or springs of various configurations, optionally further including a dampening mechanism as for instance found in various shock absorbers to damping the elastic movement between the inner support structure 3 and outer protective cage 4.

The control system 5 comprises an electronic circuit comprising at least one microprocessor 15 and at least one non-volatile memory 16 in which control programs 17 are stored. The control programs includes at least a program for stabilizing orientation 18 executed by the microprocessor 15 depending on the inputs received from the sensing system 6.

The various sensors of the sensing system 6 are connected to the electronic circuit of the control system and transmit measurement signals to the control system, and the control system is connected to the multi-propeller propulsion system to transmit control signals for control of the motors 10 of the multi-propeller propulsion system.

The multi-propeller propulsion system comprises a plurality of propellers 8 arranged in a spaced apart and non-coaxial manner.

In a preferred embodiment, there are four propellers arranged in a rectangular arrangement Re, whereby the four propellers may be arranged substantially in a same plane B orthogonal to the axis of rotation A of the propellers. Propellers may have a slight tilt angle (typically 1° to 5°) relative to the plane B in order to improve stability and control about the Yaw axis. The propellers may be arranged in more than one plane orthogonal to the axis of rotation A of the propellers, such that some propellers can overlap with each other In the embodiments illustrated in FIGS. 6a, 6b, and 7, and schematically illustrated in FIG. 9, there are four single propellers 8 in a quad arrangement, whereby the propeller blades may essentially be aligned in a same plane B or in offset planes, for instance to allow the blades of adjacent propellers to overlap.

Figure 7:
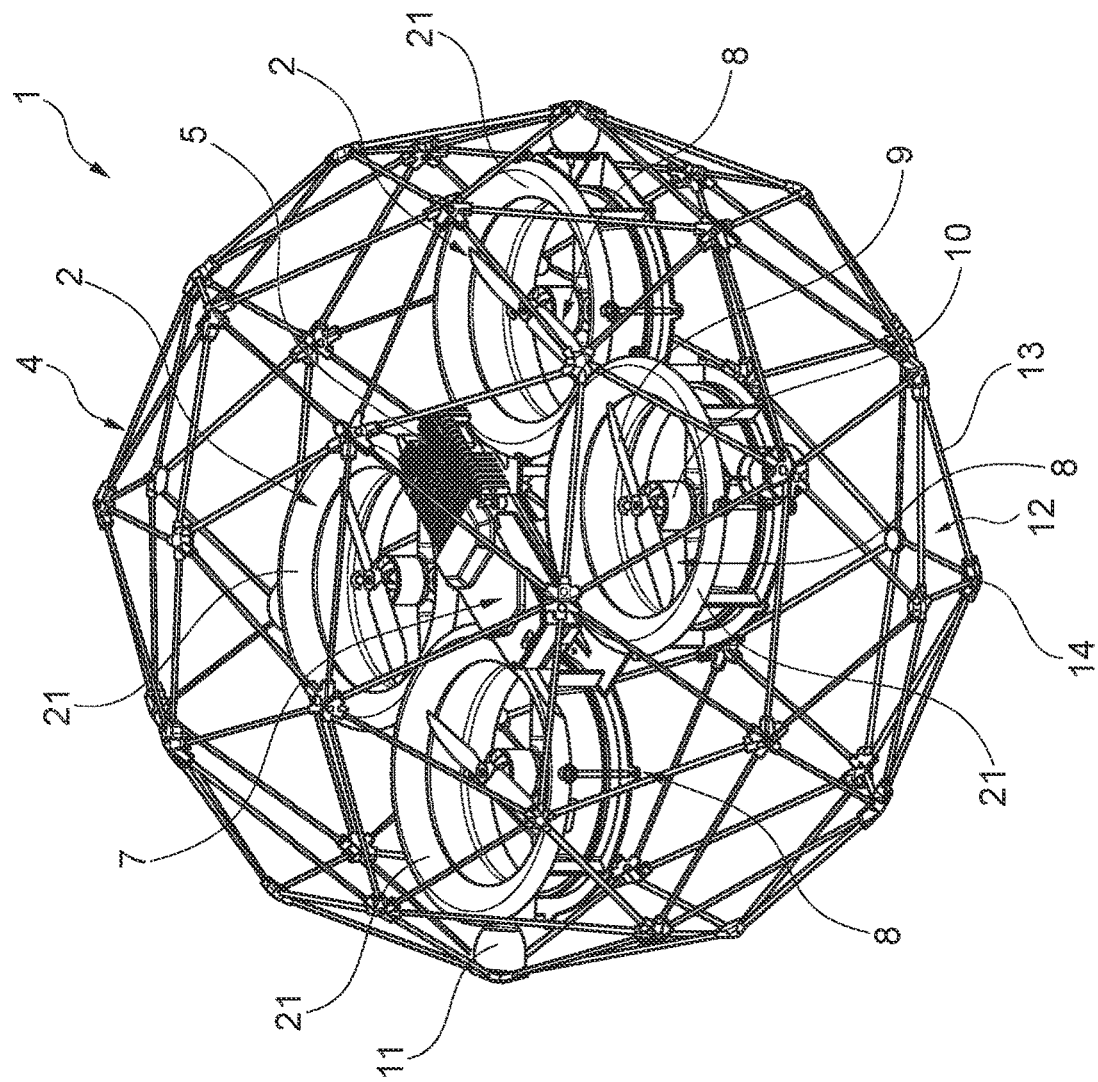
FIG. 7 is a view similar to FIG. 5a showing yet another embodiment of the invention.
Figure 8:
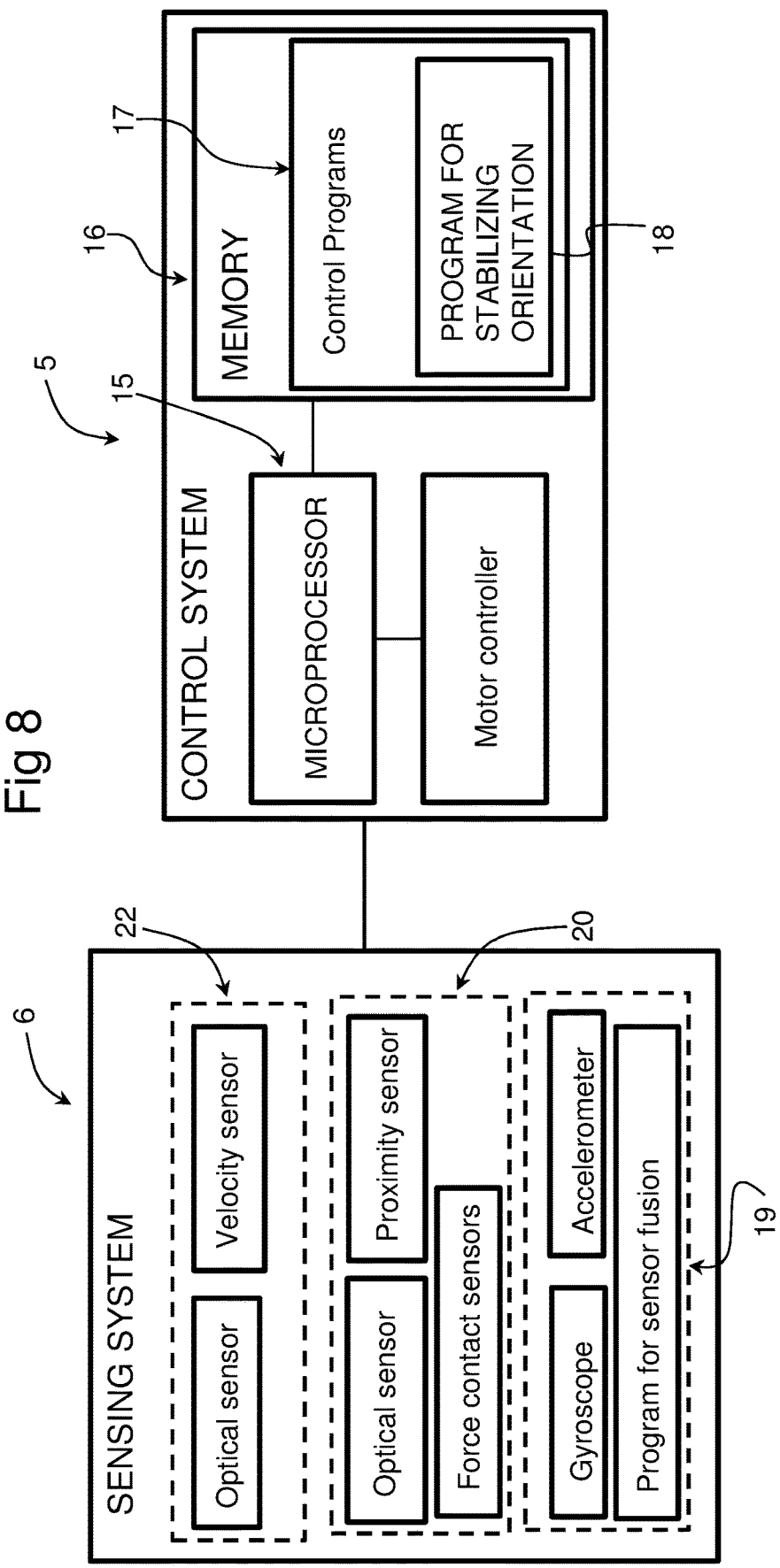
FIG. 8 is a schematic block diagram of a sensing and control system of a UAV according an embodiment of the invention.

The propellers may, in embodiments, for instance as illustrated in FIG. 7, be surrounded by a an air duct 21 that serves to increase efficiency and thrust of the propeller.

In an advantageous embodiment, there are four pairs 8a, 8b of propellers arranged in a quad arrangement as illustrated in the embodiments shown in FIGS. 5a to 5g.

In this embodiment, the pairs 8a, 8b of propellers are also arranged in a spaced apart and a non-coaxial manner in a square or rectangular formation Re.

In an advantageous embodiment, the propellers of the pair 8a, 8b may be arranged in a coaxial manner such that the rotor axes are aligned and the motors and blades are in mirror image symmetry.

Each propeller 8, 8a, 8b comprises propeller blades 9 driven in rotation by a motor 10 comprising a stator and a rotor, whereby in preferred embodiments the rotor is directly coupled to the propeller blades 9.

The propeller blades 9 may, in an advantageous embodiment, comprise a symmetrical blade shape, such that the propeller blades may rotate in both the clockwise and anti-clockwise directions with similar aerodynamic properties. It is however possible to provide the propeller blades with a non-symmetrical shape considering that in many applications, the reversibility of the blade rotation is used only for instances of control, the normal and general flight mode being based on a specific direction of rotation of the propeller blades.

The aforementioned embodiment is advantageous in particular to a multi-propeller propulsion system with a set of single propellers 8 arranged in a spaced apart and non-coaxial manner, whereas in the embodiment illustrated in FIGS. 5a to 5g, the propellers of each pair 8a, 8b may be configured to turn in only one direction. During flight, only propellers on one side (e.g. bottom side) may be rotating while the propellers on the other side (e.g. top side) may be stationary. Upon collision with an obstacle, thrust may be reversed on the distal pair of propellers by driving the previously stationary top propeller and switching off or reducing thrust on the flight propeller on the bottom side. Thus, in order to reverse thrust, one of the pair or propellers is switched on and the other switched off or reduced in speed. In the latter embodiment, the motors do not need to be reversible.

Preferably however, in the embodiment illustrated in FIGS. 5a to 5g, the propeller blades 9 of each pair 8a, 8b may be turned in both a clockwise and an anti-clockwise direction (i.e. in a reversible manner) in order to provide great flexibility in the various possible flight modes, and also to carry a high payload while nevertheless offering a high degree of flight control and agility.

The motor 10 may advantageously comprise a rotor position sensor, for instance in the form of a Hall effect sensor or optical encoders mounted on the stator to detect the angular position of the rotor. This allows for a particularly rapid change in direction of the rotor. Without knowing the exact position of the rotor, control of the inversion of the rotor direction is more difficult and less reliable.

In the embodiment illustrated in FIGS. 5a to 5g and schematically represented in FIGS. 10a to 10d, each of the propellers 8 of the pair of coaxial propellers comprises a motor 10 and propeller blades 9, which in a preferred embodiment are mounted in mirror image symmetry, the rotor axes A being aligned. The two propellers 8a, 8b of a pair may be operated simultaneously in different modes, a first mode comprising both propellers turning in a direction generating thrust in the same direction, or in a manner that the propellers of the pair generate thrust in opposing directions.

A further mode of operation is that only one of the propellers of the pair rotates and generates thrust in one direction or in an opposite direction. Depending on the control applied to the motors, the thrust generated by each the propellers of the pair may be individually controlled and vary independently of each other to allow a very rapid response enabling a very fine and stable control of the drone.

In the variant illustrated schematically in FIG. 9, the spaced apart propellers arranged in non-coaxial arrangement, for instance a tri, quad, penta or hexa formation, may be controlled such that when entering into contact with an obstacle 26 the propellers 8" distal from the point of contact P may have the direction of thrust F1 reversed (by changing the direction of rotation of the rotor of the motor) so as to create a moment of rotation M about the point of contact P that counters the moment of rotation created by the thrust of the proximal propellers 8' closer to the point of contact P, taking into account the moment of rotation generated by the gravitational force G and the inertial moment of rotation about the point of contact P in the case of a dynamic collision. The relative thrust of the distal 8" and proximal 8' propellers may be controlled accordingly to stabilize the UAV. For tilt angles larger than 90°, the direction of thrust F2 of the propellers close to the point of contact may also be controlled such that it is reversed (also shown of FIG. 11a). The distal propellers 8" correspond to the propellers at the rear end of the UAV, and the proximal propellers 8' correspond to the propellers at the front end of the UAV, in relation to the direction of flight of the UAV, or the general direction of thrust of the UAV when statically pushing against an object.

The control of the moment of rotation M by reversing the thrust of the distal propellers 8" may also be used to create a static or hold position of the UAV about the contact point P or to change the angle of inclination α of the UAV relative to the obstacle 26 which may be useful in certain applications, or to adjust the angle α at a position that allows for a more stable static or hold position.

As illustrated in FIGS. 11a to 11b, depending on the angle of inclination α of the thrust axis T (which is perpendicular to the plane B of the rotor blades 9) with respect to the vertical, the amount of thrust F1, F2 applied by each propeller for holding the UAV in a static position depends on the angle of inclination α, in particular in the range from 30 degrees to 150 degrees. The forces F1 and F2 and the moment of rotation M can vary in their exact values (as illustrated by gray area in FIGS. 11a to 11b) depending on the UAV configuration, number of propulsion systems, and contact location relative to the propulsion system.

In the embodiment illustrated in FIGS. 5a to 5g and FIG. 8, the resultant thrust F1a+F1b produced by a distal pair of propellers 8a",8b" may be varied with respect to the resultant thrust F2a+F2b produced by the proximal pair 8a',8b', such that similar to the case illustrated in FIG. 9, the distal pair 8a",8b" may produce an overall negative thrust whereas the proximal propeller pair 8a', 8b' produces a positive thrust such that the moment of rotation M about the point of contact P may be adjusted taking into account the moment of rotation created by gravitational force G, for a static hold position against the obstacle 26 or for compensating for inertial moment upon collision. In this embodiment, one of the propellers 8a", 8a' of the pair of propellers may be static during flight, especially flight in which collisions are expected. And propellers 8b', 8b" may be optimized for upwards lift. Alternatively, one of the propellers 8a", 8a' generating downward thrust may be rotating to generate a small amplitude of downward thrust in particular when a collision is anticipated. Upon collision with an obstacle 26 causing a rotation of the UAV 1, the propeller 8a" producing no thrust or downward thrust compared to the propeller producing lift 8b" for flight of UAV, may be operated to produce downward thrust very quickly (while the other propeller 8b" of the pair may be switched off) in order to significantly increase the reactivity of the propellers 8a", 8b" in operating a moment of rotation M of the UAV to counteract the moment of rotation exhibited by inertia upon collision of the UAV with an obstacle 26.

The state of readiness of the propeller of a pair for generating reverse thrust may be controlled manually by the operator of the UAV, or automatically by the sensing system, whereby when the UAV 1 is within a certain distance from an obstacle 26, the propeller pair 8a, 8b may be configured to operate in a state of readiness for rapidly generating reverse thrust for instance by switching off one of the propellers of the pair, or even by rotating one of the propellers of the pair in reverse thrust of lower amplitude than the other propeller of the pair producing lift for flight of the UAV.

In a quad arrangement of propeller pairs as illustrated in FIGS. 5a to 5g, 6a, 6b and 7, each of the propellers in a spaced apart arrangement, or of the propeller pairs in the spaced apart arrangement, are operated to produce thrust independently so as to maintain the desired orientation of the UAV about the pitch, yaw, and roll axes for flight or hovering of the UAV depending on the signals input from the sensing system 6 and the desired flight mode and control.

LIST OF FEATURES

| |
|---|
| Vertical take-off and landing (VTOL) unmanned aerial vehicle (UAV) 1 |

Multi-propeller propulsion system 2
  propellers arranged spaced apart in a non-coaxial manner
  pairs of propellers arranged spaced apart in a non-coaxial manner
    Quad arrangement
  Propeller 8
    Propeller blades 9
      Symmetrical blade
    Motor 10
      Rotor
      Stator
        Rotor position sensor
          Hall sensor
Inner support structure 3
  Suspension 11
  Propeller duct 21
Outer protective cage 4
  Frame modules 12
    Beams 13
    Connectors 14
Control system 5
  Microprocessor 15
  Memory 16
    Control Programs 17
      Program for stabilizing orientation 18
Sensing system 6
  Orientation sensing system 19
    Gyroscope
    accelerometers
  Obstacle sensing system 20
    distance sensors
      Optical sensor
      Ultrasound sensor
      Electromagnetic radar
      Magnetic proximity sensor
  Position sensing system 22
Power source 7
  Battery
Centre of gravity Cg
Point of contact P
G gravitational force
F propeller propulsion force
M Moment of force (torque)
T Thrust (propulsion system resultant force at centre of gravity G)
Obstacle 26

The invention claimed is:

1. A vertical take off and landing (VTOL) unmanned aerial vehicle (UAV) comprising a multi-propeller propulsion system, an outer protective cage surrounding the multi-propeller propulsion system, an autonomous power source, a sensing system, and a control system connected to the sensing system to receive measurement signals from the sensing system, the control system electrically connected to the multi-propeller propulsion system to control motors of the propulsion system, the sensing system comprising at least an orientation sensor and a displacement sensor configured to measure the orientation and displacement of the multi-propeller propulsion system, the multi-propeller propulsion system comprising at least two propellers arranged spaced apart in a non-coaxial manner, each propeller comprising a motor having a stator and a rotor coupled to propeller blades, the control system comprising at least one microprocessor and at least one non-volatile memory in which at least one control program is executable by the microprocessor to control the multi-propeller propulsion system for flight or hovering of the VTOL UAV, wherein the control system further comprises a control program, said control program including at least a program for stabilizing orientation of said VTOL UAV configured to reverse thrust on at least one propeller of the at least two propellers distal from a point of contact (P) with an obstacle, delivering therefore a downwards force to said VTOL UAV via said at least one propeller, while controlling a motor of a proximal propeller of the at least two propellers from the contact point (P) to generate lift, delivering therefore an upwards force to said VTOL UAV via said proximal propeller, the thrust of the distal and proximal propellers being controlled to exert lift on the VTOL UAV to counteract gravitational force (G) thereon and apply a moment of rotation (M) about said point of contact (P) to stabilize the position of the VTOL UAV or to counteract torque resulting from inertia.

2. The VTOL UAV according to claim 1 wherein the multi-propeller propulsion system further comprises propellers arranged in a rectangular configuration.

3. The VTOL UAV according to claim 1 wherein the multi-propeller propulsion system comprises a plurality of pairs of propellers arranged spaced apart in a non-coaxial manner.

4. The VTOL UAV according to claim 3 wherein the propellers of a pair are arranged in mirror image symmetry.

5. The VTOL UAV according to claim 1 wherein the propeller blades are symmetrical such that the propeller blades have the same aerodynamical properties in both clockwise and anti-clockwise directions of rotation.

6. The VTOL UAV according to claim 1 wherein each propeller of the at least two propellers arranged spaced apart in a non-coaxial manner comprise of a pair of coaxial propellers connected to the control system in a manner configured to be independently controlled such that the thrust generated by each propeller of the pair of coaxial propellers may be individually controlled and vary independently of each other.

7. The VTOL UAV according to claim 6 wherein at least some of said propellers of the pair of coaxial propellers are reversible and may be controlled by the control system to rotate in a clockwise direction or in an anti-clockwise direction, or alternatively at least some of said propellers are reversible by varying a pitch of their blades while still rotating in the same direction, depending on the amount of thrust and the direction of thrust to be generated by the propeller.

8. The VTOL UAV according to claim 1 wherein the multi-propeller propulsion system, power source, and control system are mounted on an inner support structure coupled to the outer protective cage via suspension elements.

9. The VTOL UAV according to claim 1 wherein the outer protective cage comprises a plurality of beams connected together by connectors forming a cage surrounding the multi-propeller propulsion system.

10. The VTOL UAV according to claim 9 wherein the outer protective cage forms a generally spherical shape around the multi-propeller propulsion system.

11. The VTOL UAV according to claim 1 wherein the sensing system further comprises at least one gyroscope and at least one accelerometer to measure orientation and a change in velocity of the VTOL UAV.

12. The VTOL UAV according to claim 1 wherein the sensing system further comprises an obstacle sensing system comprising at least one distance sensor which may include an optical sensor, an ultrasound sensor, or a microwave sensor configured to detect a distance of the VTOL UAV from an external object and optionally to calculate a velocity of the UAV relative to the external object.

13. The VTOL UAV according to claim 1 wherein the sensing system further comprises at least one proximity sensor configured to detect a contact of the outer protective cage with an external object.

14. The VTOL UAV according to claim 1 wherein the multi-propeller propulsion system comprises four propellers or four pairs of propellers arranged spaced apart in a square or rectangular configuration.

15. The VTOL UAV according to claim 1 wherein a plurality of propellers arranged spaced apart in a non-coaxial manner rotate essentially in a same plane (B).

16. The VTOL UAV according to claim 1 wherein the motors and propellers are configured to change thrust generated by the motors and propellers at a rate of k=8 to 50 times a hovering thrust per second generated by the motors and propellers.

17. The VTOL UAV according to claim 1 wherein each of the at least two propellers are mounted in a duct surrounding the propeller.

\* \* \* \* \*